United States Patent [19]
Lindroos et al.

[11] Patent Number: 4,856,158
[45] Date of Patent: * Aug. 15, 1989

[54] SPREADER ROLL OR EQUIVALENT FOR A FABRIC IN A PAPER MACHINE, AND METHOD FOR MANUFACTURING THE SAME

[75] Inventors: Kaj Lindroos; Mauno Töhönen, both of Jyväskylä, Finland

[73] Assignee: Valmet Oy, Finland

[*] Notice: The portion of the term of this patent subsequent to Aug. 15, 2006 has been disclaimed.

[21] Appl. No.: 13,775

[22] Filed: Feb. 12, 1987

[30] Foreign Application Priority Data

Feb. 13, 1986 [FI] Finland .................................. 860670

[51] Int. Cl.$^4$ ............................................. B21B 13/02
[52] U.S. Cl. ..................................... 29/116.1; 29/130; 29/132; 29/527.1
[58] Field of Search ....................... 29/116 R, 130, 132, 29/527.1, 110, 121.1; 162/281, 287

[56] References Cited

U.S. PATENT DOCUMENTS

| | | | |
|---|---|---|---|
| 3,520,747 | 7/1970 | McGavghey | 29/130 |
| 3,593,398 | 7/1971 | Hess et al. | 29/132 |

FOREIGN PATENT DOCUMENTS

| | | | |
|---|---|---|---|
| 234738 | 7/1909 | Fed. Rep. of Germany | 29/130 |

Primary Examiner—P. W. Echols
Assistant Examiner—Irene Cuda
Attorney, Agent, or Firm—Steinberg & Raskin

[57] ABSTRACT

A spreader roll supported at the middle thereof for a wire or felt in a paper machine, comprising a metallic inner tube and an outer tube attached onto the inner tube through an intermediate part, the intermediate part being substantially symmetric relative to a transverse center plane of the roll. The inner tube and the outer tube are substantially coaxial with one another when the roll is in an unbent state, with annular intermediate spaces situated between the tubes at both sides of the intermediate part, such intermediate spaces being dimensioned to permit deflection of the inner tube and the outer tube in different directions relative to one another by the effect of tensioning force of the fabric arranged to run over the roll. Ends or flanges can be attached to outer ends of the inner tube, while axle journals can be attached to these ends or flanges, by means of which the roll can be journaled to revolve. The double mantle of the roll and its intermediate part thereof are composed of a metallic inner tube, preferably made of steel, and an outer tube and intermediate part both made of reinforced plastic. The intermediate part is made of a single joint-free piece of reinforcement plastic together with the outer tube, and is manufactured onto a middle portion of the inner tube.

15 Claims, 2 Drawing Sheets

SPREADER ROLL OR EQUIVALENT FOR A FABRIC IN A PAPER MACHINE, AND METHOD FOR MANUFACTURING THE SAME

BACKGROUND OF THE INVENTION

Reference is made to commonly-owned application Ser. No. 013,774 filed simultaneously herewith.

The present invention is directed to a spreader roll or equivalent for a fabric such as a wire or felt in a paper machine, the spreader roll being supported at the middle thereof, and comprising a metallic inner tube and an outer tube attached onto the inner tube by means of an intermediate portion, the intermediate portion being substantially symmetric relative to a transverse centre plane of the roll, and with the inner tube and outer tube being substantially coaxial with one another when the roll is in an unbent state. Between the tube portions, annular intermediate spaces are situated at both sides of the intermediate part, these intermediate spaces being dimensioned so that they permit deflection of the inner tube and of the outer tube in different directions relative to one another by the effect of the tensioning force of the fabric arranged to run over the roll. The roll also comprises ends that are attachable to outer ends of the inner tube, with axle journals being attachable to these ends. By means of these attachable ends and axle journals, the roll can be journaled to revolve or rotate.

The present invention is also directed to a method for manufacturing a spreader roll in accordance with the present invention.

It is known in the prior art, to use rolls in a paper machine which are supported at the middle thereof, e.g. as a spreader roll for a fabric, breast roll for a wire, drawing roll, or guide roll. Such rolls comprise an inner tube made of steel and having a circular cylindrical shape, and an outer tube made of steel and attached onto the inner tube, e.g., by means of shrink-on joints. The tubes are joined together symmetrically relative to a centre plane of the roll. At the ends of the inner tube, there are end flanges and axle journals attached to the flanges. Between the inner mantle and the outer mantle of the roll, in a middle region thereof, a shrink-on joint is used. The making of this joint and of corresponding other shrink-on joints, has proven to be difficult and expensive. Moreover, a drawback of the shrink-on joints is that the inner tube tends to break at the lateral area of the joint. This is largely caused by vibration wear and fatigue fracturing, which start from these lateral areas of the shrink-on joints. The making of the shrink-on joint is expensive, in particular because the inner face of the outer tube of the roll, which is not easily accessible, must be machined to quite precise dimensions.

The prior-art metallic spreader rolls described above also have the drawback that the rolls become quite heavy, which causes, e.g., detrimental deflection, while their spreading effect is not as good as would be desirable. The cantilevering of these heavy rolls is often problematic when these rolls are installed in or paper machines in connection with the renewal thereof.

The length of a typical prior-art spreader roll made of steel by means of shrink-on joints is $L=9450$ mm., with an outer diameter $Du=1010$ mm., in which case the weight of the double mantle of the roll becomes even as high as about 13,000 kg.

With respect to the prior art related to the present invention, it is further ascertained that, e.g., paper machine rolls made of plastic reinforced with fibre glass are known in the prior art, e.g., as wire guide rolls. The fibre glass coating is, however, used exclusively for protection against corrosion, and not as a structural component of the roll.

SUMMARY OF THE INVENTION

Accordingly, it is a principle object of the present invention to avoid drawbacks that have been described above and to provide a roll of lower weight which is more resilient and which therefore has a better spreading effect.

It is another object of the present invention to provide a roll of the type concerned, supported at the middle thereof, which is less sensitive to corrosion as compared with prior-art rolls made partially or totally out of metal.

It is a further object of the present invention to provide a roll supported at a middle thereof which is more resistant to vibration wear and to fatigue fractures.

It is an additional object of the present invention to provide a roll supported at a middle thereof in which, by making use of new manufacturing technology, the drawbacks of a roll of steel construction have been eliminated, while such a roll construction is produced which is more advantageous than prior-art rolls both regarding the material cost and regarding the cost of manufacture.

It is another object of the present invention to provide a roll in which separate coating is not needed.

These and other objects are attained by the present invention which is directed to a spreader roll supported at a middle thereof, principally characterized by the double mantle of the roll and its intermediate portion being composed of a metallic inner tube, preferably made of steel, and of an outer tube and intermediate part made of reinforced plastic, the intermediate part being made of one joint-free piece of reinforced plastic, with the outer tube and manufactured onto the middle portion of the inner tube.

The method in accordance with the present invention for the manufacture of the noted spreader roll is principally characterized by comprising the following steps:

(a) intermediate core pieces are placed or formed onto the metallic inner tube, the intermediate core pieces corresponding to the dimensions and forms of intermediate spaces between the inner and outer tubes of the roll to be manufactured; and (b) the intermediate part is produced or grown between the inner ends of the intermediate core pieces, the intermediate part being allowed to adhere directly to the outer face of the inner tube, while in connection with, or after formation of the intermediate part, the outer-tube portions are formed onto the intermediate core pieces and the intermediate piece.

According to the present invention, such a roll is provided in which fractures of the inner tube, which have occurred in prior-art all-metal rolls, can be avoided because the inner tube of steel has no shoulders and no possibility of formation of fretting.

By means of a spreader roll in accordance with the present invention, it is possible to increase the spreading effect of the roll and its effect of equalizing the difference in length at the middle of the fabric loop, because the outer mantle can be dimensioned more flexibly than in the prior art.

By means of the roll construction in accordance with the present invention, the weight of the roll can be reduced by about 50 per cent as compared with the prior-art all-metal rolls, so that the weight of a spreader roll in accordance with the invention corresponds to the weight of the present-day drawing rolls.

It is a further important advantage that, in the present invention, the roll need not be provided with a separate coating, while the thickness of the outer mantle of reinforced plastic is preferably made large enough so that it permits renewal grindings.

BRIEF DESCRIPTION OF THE DRAWINGS

The present invention will be described in greater detail below with reference to certain exemplifying embodiments illustrated in the accompanying drawings, to which the present invention is not to be exclusively confined. In the drawings.

DESCRIPTION OF THE PREFERRED EMBODIMENTS

Figure 1:
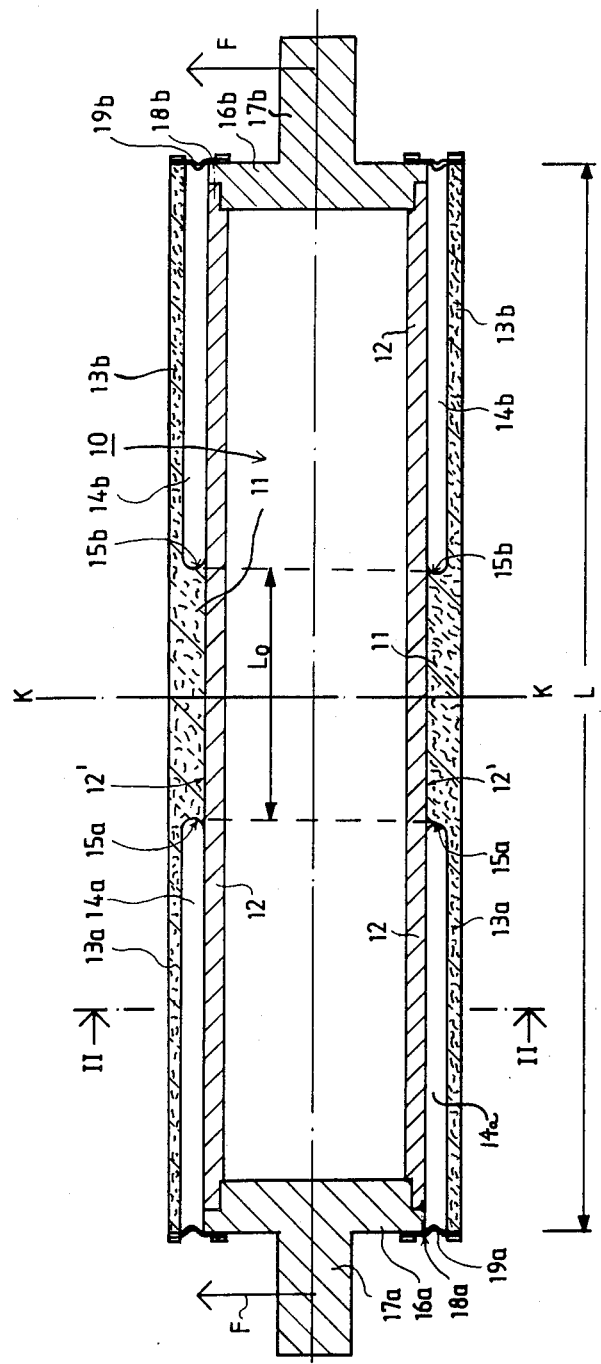
FIG. 1 is a central axial sectional view of a spreader roll in accordance with the present invention.

The spreader roll 10 in accordance with the present invention illustrated in FIG. 1, comprises two tubular parts 12 and 13a, 13b which are substantially coaxial in the undeflected state and which are separated from each other by annular intermediate spaces 14a, 14b. The tubular parts 12 and 13a, 13b are interconnected by an intermediate part 11 at the middle of the roll 10, i.e. symmetrically relative to a centre plane K-K of the roll 10.

Figure 2:
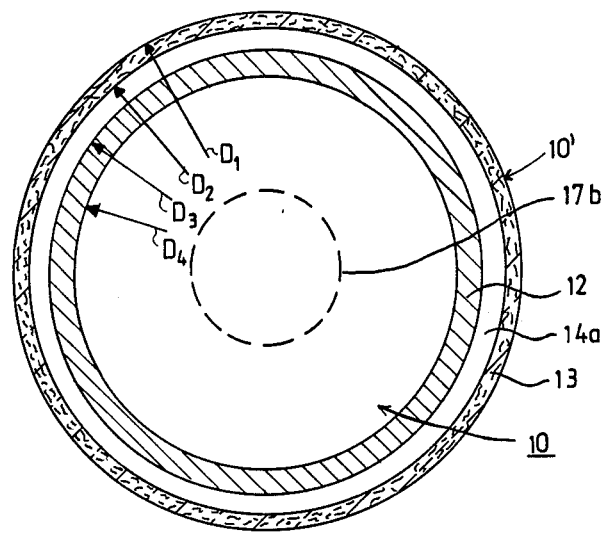
FIG. 2 is a sectional view along line II—II of FIG. 1.

In the spreader roll illustrated in FIGS. 1 and 2, the inner tube 12 is a steel tube of substantially uniform thickness and with no shoulders, e.g. made of a metal plate. The inner tube 12 may be even allowed to remain unmachined at the other parts except at the locations of fastening of the end flanges 16a and 16b.

The outer mantle 13a, 13b and the intermediate part 11 are laminated onto the inner tube 12 acting as the frame of the roll 10. The outer mantle 13a, 13b and the intermediate part 11 are made of reinforced plastic, e.g. of fiberglass and epoxy, and by means of the method in accordance with the present invention, may be manufactured as a single piece of reinforced plastic with no joints. In the manufacture of the reinforced plastic part, e.g. lamination, the inner tube 12 is used as a mould so that the reinforced plastic is allowed to adhere, substantially symmetrically with respect to the centre plane K—K of the roll 10, directly to a roughened, e.g. sand-blasted, steel face 12'. The intermediate part 11 of reinforced plastic is joined to the preferably roughened outer face 12' of the inner tube 12 directly and without intermediates therebetween.

Figure 3:
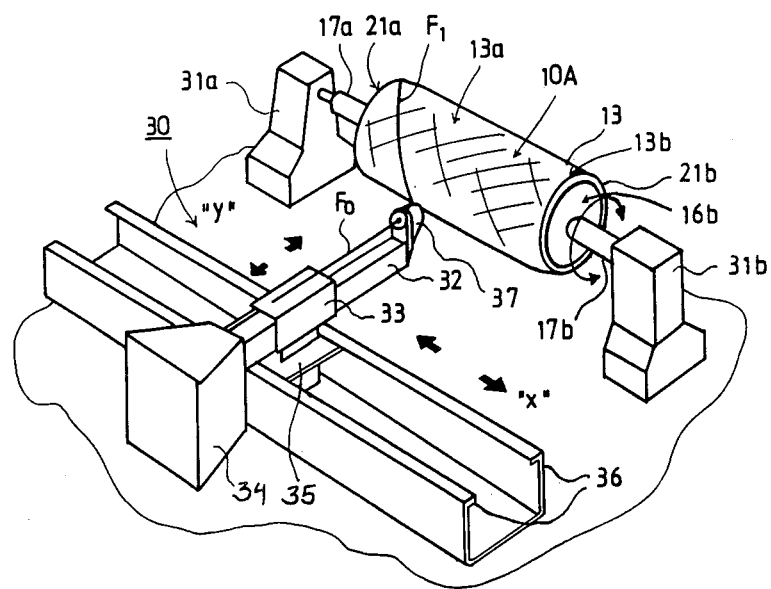
FIG. 3 is an axonometric view of apparatus by means of which the method in accordance with the present invention may be carried out, and a spreader roll in accordance with the present invention can be manufactured.

The intermediate spaces 14a, 14b between the inner tube 12 and the outer tube 13a, 13b are produced by using intermediate core pieces fitted onto the inner tube 12 (pieces 21a and 21b in FIG. 3). The intermediate core pieces or filler pieces are made, e.g., by bending out of styrofoam onto the inner tube 12 so that the roughened middle part 12' of the tube 12 remains free. The core pieces may also be made of a suitable band material by winding the band onto the inner tube 12. The core pieces are removed either by means of solvent or mechanically, or by both after hardening of the piece 11, 13a and 13b of reinforced plastic.

The outer, tube 13a, 13b of reinforced plastic is made of sufficient thickness, e.g. $D_1 - D_2 = 10$ to 15 mm, so that this part, at the same time, forms a substituent for a roll coating and permits renewal grindings.

End flanges 16a, 16b are attached to both ends of the inner tube, e.g., by means of screw joints 18a, 18b, and the end flanges 16a, 16b are provided with axle journals 17a, 17b through which the roll 10 can be journaled. The intermediate spaces 14a, 14b are closed by end rings 19a, 19b of an elastic material, so that contaminants do not have access into the intermediate spaces 14a, 14b.

When a fabric in a paper machine, such as a wire or felt, is passed over the roll 10 illustrated in FIG. 1, the fabric is tensioned (a supporting force in the opposite direction is indicated by F in FIG. 1), and the roll 10 is deflected so that its inner tube 12 of steel is deflected (mostly at the outer ends thereof) in the direction of the supporting forces F. The forces are transmitted via the intermediate part 11 to the outer tube 13a, 13b of reinforced plastic, which is also deflected (mostly at the ends thereof) in the direction of the tensioning forces, and in the direction opposite to the supporting forces F.

The outer mantle 13a, 13b deflected in this manner, has the effect of spreading the fabric (not illustrated) passing over the roll 10, while at the same time, the mantle has the effect of equalizing the differences in length between the middle portion and lateral portions of the fabric loop, which means that with the roll 10 of the present invention, substantially uniform distribution of tightening tension of the fabric loop in the transverse direction of the fabric loop, is achieved.

The parts 13a and 13b of the outer mantle of the roll shown in FIG. 1 behave in the same way as a substantially uniformly loaded cantilever beam. The critical areas on the outer mantle are the areas of connection between the inner mantle and the outer mantle, i.e. the areas at ends 15a and 15b of the intermediate part 11, whereby, in this respect, attention must be paid to the shape and reinforcement of such areas, e.g. to the alignment and amount of reinforcing fibers.

FIG. 3. is a schematic illustration of an exemplary apparatus, by means of which a roll 10 in accordance with the present invention can be manufactured by the method of the present invention. The apparatus includes bearings stands 31a and 31b, between which the roll blank 10A, i.e. the inner tube with its ends flanges 16a, 16b and axle journals 17a, 17b is fitted so as to be rotated about a central axis thereof. The apparatus 30 includes devices for feeding of fluid resin and a bundle or mat of reinforcement fiber, such devices comprising a transverse beam 32 fitted in a guide 33, in which the end of the beam situated nearest to the roll blank 10A is provided with a control piece 37, through which the bundle $F_1$ or mat of reinforcement fiber is wound onto the roll blank 10A that is being manufactured.

The fiber bundle or mat is saturated with resin and/or resin is fed onto the roll blank 10A separately and, if necessary, by means of separate devices. By shifting the beam 32 in its guide 33, the control piece 37 can be adjusted in the direction Y of the radius of the roll blank 10A. The guide 33 is attached to a sledge 35, which is arranged to move in a guide 36 so that the control piece 37 can be shifted in the direction X, i.e. in the axial direction of the roll blank 10A. At the outer end of the beam 32, there are devices 34 out of which the fiber bundle $F_0$ or mat is fed into the control piece 37.

The manufacture of a roll 10 in accordance with the present invention by means of the apparatus 30 illustrated in FIG. 3, and by means of the method in accordance with the present invention, is begun by placing annular intermediate core pieces 21a and 21b onto the inner tube 12 (diameter $D_3$) placed between the stands 31a and 31b by means of the axle journals 17a, 17b. The annular intermediate core pieces 21a and 21b correspond to the shape and size of the intermediate spaces 14a and 14b, i.e. the inner diameter $D_3$ and the outer diameter $D_2$ of intermediate spaces 14a and 14b (FIG. 2). Then, the roll blank 10A is caused to revolve, and the placement or growing of the intermediate part 11 is carried out, e.g., up to the dimension $D_2$ of the inner diameter of the outer tube 13, whereupon the winding and laminating process is extended onto the core pieces 21a and 21b so as to form the outer tube 13a and 13b. The winding of the reinforcement fibre bundle $F_1$ or mat, and the feeding of the resin, are continued by traversing in the direction X until the necessary outer diameter $D_1$ of the outer tube 13a, 13b is reached. After hardening of the reinforced plastic, the outer face of the outer tube 13 is machined, if necessary.

In an example of a spreader roll in accordance with the present invention, the spreader roll is manufactured of epoxy-reinforced with fiber: glass so that dimensioning of the roll is as follows:

$D_1 = 1,000$ mm.;
$L = 9,450$ mm.;
$L_0 = 1,300$ mm.;
$D_2 = 970$ mm.;
$D_3 = 924$ mm.;
$D_4 = 860$ mm.

The weight of the double mantle of a combination roll made of steel and reinforced plastic and having the dimensions given above, is about 7,200 kg.

When a wire or felt loads the roll 10, the parts 13a and 13b of the outer tube are deflected symmetrically relative to the centre plane K—K in the same manner as a substantially uniformly-loaded cantilever beam. In such a case, the areas at the ends 15a and 15b of the intermediate part 11 become critical. Such ends 15a, and 15b are preferably rounded, and starting from these ends, the wall thickness of the outer tube 13a and 13b is uniform, or the wall thickness may be reduced, e.g. continuously when going towards the ends of the roll 10.

The deflection of the outer tube 13a, 13b and the form of the deflection line, and at the same time the spreading effect can be controlled partially by means of the choice of the length $L_0$ of the intermediate part 11. The ratio of the length L of the double mantle to the length $L_0$ of the intermediate part 11 is, as a rule, within the range of $L/L_0$ = about 6.5 to 8.0, preferably within the range of $L/L_0$ = about 7.0 to 7.5.

Suitable combinations of plastic and reinforcement fiber for the outer tube 13a, 13b are, e.g., epoxy/fiberglass, polyester/fiberglass, and epoxy/carbon fiber. From the point of view of the spreading effect, the most efficient deflection form is obtained for the outer tube by changing the alignment and/or quantity of the fibers in the reinforcement material appropriately in different cross-sections of the outer tube 13a, 13b.

The preceding description of the present invention is merely exemplary, and is not intended to limit the scope thereof in any way. Various details of the present invention may vary within the scope of the inventive concept described above and may differ from the exemplary details described above.

What is claimed is:

1. A spreader roll or equivalent for a fabric such as a wire or felt, in a paper machine, comprising
    an inner hollow tube,
    an outer hollow tube situated over said inner hollow tube, said outer hollow tube comprising an inwardly extending centrally located intermediate part integral with said outer hollow tube and attached onto said inner hollow tube, said intermediate part being substantially symmetrical relative to a transverse center plane through said roll, said inner and outer hollow tubes being substantially coaxially with one another when said roll is in an unbent state, and forming annular intermediate spaces between said inner and outer hollow tubes at both sides of said intermediate part, said intermediate spaces being dimensioned to permit deflection of said inner and outer hollow tubes in different directions relative to one another by the effect of tensioning force of fabric arranged to run over said roll,
    said inner hollow tube adapted to be coupled to axle journals at outer ends thereof, whereby said roll can be rotatably journaled,
    wherein said inner tube is formed of metallic material, and said outer tube and inwardly extending intermediate part thereof are made of a single joint-free integral piece of reinforced plastic being formed onto a middle portion of said inner tube.

2. The roll of claim 1, wherein said inner tube is a steel tube of substantially uniform thickness, and being substantially free of shoulders.

3. The roll of claim 2, wherein said inner tube is a steel plate.

4. The roll of claim 1, wherein
    said inner tube comprises a roughened outer face, with said intermediate part of said outer tube being directly joined to said roughened outer face.

5. The roll of claim 1, wherein said outer tube and intermediate part thereof are made of epoxy resin or equivalent, reinforced with fiber glass or equivalent.

6. The roll of claim 1, wherein a ratio of length of said roll to length of said intermediate part is from about 6.5 to about 8.0.

7. The roll of claim 6, wherein said ratio is about 7.0 to about 7.5.

8. The roll of claim 1, wherein said intermediate part comprises rounded and concave ends at which an outer face of said inner tube joins an inner face of said outer tube.

9. Method for manufacturing a spreader roll or equivalent, comprising the steps of
    dispensing intermediate core pieces onto a metallic inner tube, the core pieces corresponding to dimensions and forms of intermediate spaces between the inner tube and an outer tube to be formed thereon,
    producing an intermediate part of the outer tube between inner ends of the intermediate core pieces, with the intermediate part directly adhering to an outer surface of the inner tube, and
    forming the outer tube upon said intermediate part and the core pieces, whereby a roll having a double mantle with the outer tube attached to the inner tube through the intermediate part, 10. The method of claim 9, wherein said intermediate part and said outer tube are applied onto said inner tube by lamenation, with the core pieces and inner tube serving as inner molds.

11. The method of claim 9, comprising the additional step of rotating the inner tube as the intermediate part and outer tube are formed thereon.

12. The method of claim 9, wherein the intermediate core pieces are disposed upon the inner tube by winding out of a band or by bending out of a sheet.

13. The method of claim 9, comprising the additional step of removing the intermediate core pieces or equivalent filler mechanically, by means of solvent, or both mechanically and by means of solvent, after a reinforced plastic part forming the outer tube and intermediate part thereof has hardened.

14. The method of claim 9, wherein said outer tube is formed simultaneously with formation of said intermediate part.

15. The method of claim 9, wherein said outer tube is formed after said intermediate part is formed.

* * * * *